US011621792B2

(12) United States Patent
Beckett, III et al.

(10) Patent No.: US 11,621,792 B2
(45) Date of Patent: Apr. 4, 2023

(54) REAL-TIME AUTOMATED CLASSIFICATION SYSTEM

(71) Applicant: NBCUniversal Media, LLC, New York, NY (US)

(72) Inventors: William R. Beckett, III, Marlboro, NJ (US); Andrew James Barsh, Englewood Cliffs, NJ (US)

(73) Assignee: NBCUniversal Media, LLC, New York, NY (US)

( * ) Notice: Subject to any disclaimer, the term of this patent is extended or adjusted under 35 U.S.C. 154(b) by 115 days.

(21) Appl. No.: 17/004,901

(22) Filed: Aug. 27, 2020

(65) Prior Publication Data

US 2021/0050926 A1 Feb. 18, 2021

Related U.S. Application Data

(63) Continuation of application No. 16/128,124, filed on Sep. 11, 2018, now Pat. No. 10,805,029.

(51) Int. Cl.
| *H04H 60/37* | (2008.01) |
| *H04H 60/07* | (2008.01) |
| *H04H 60/64* | (2008.01) |
| *H04H 60/48* | (2008.01) |
| *G06N 20/00* | (2019.01) |

(52) U.S. Cl.
CPC .......... *H04H 60/377* (2013.01); *G06N 20/00* (2019.01); *H04H 60/07* (2013.01); *H04H 60/48* (2013.01); *H04H 60/64* (2013.01)

(58) Field of Classification Search
CPC ...... H04H 60/377; H04H 60/07; H04H 60/48; H04H 60/64; H04H 60/66; G06N 20/00

USPC .......................................................... 382/159
See application file for complete search history.

(56) References Cited

U.S. PATENT DOCUMENTS

| 10,079,649 | B2* | 9/2018 | Oh ......................... H04H 60/06 |
| 10,432,983 | B2* | 10/2019 | Koumchatzky ........ G06N 20/00 |
| 10,474,749 | B2* | 11/2019 | Ye .......................... H04H 60/07 |
| 11,006,160 | B2* | 5/2021 | Schnurr ............ H04N 21/23418 |
| 11,093,837 | B2* | 8/2021 | Oliner .................... G06N 20/00 |
| 11,227,208 | B2* | 1/2022 | Oliner .................. G06N 3/0445 |
| 11,244,746 | B2* | 2/2022 | Reicher ................. G16H 10/60 |
| 2004/0083389 | A1 | 4/2004 | Yoshida |

(Continued)

FOREIGN PATENT DOCUMENTS

| CN | 106063166 | * | 4/2019 | ....... H04N 21/44213 |
| KR | 20180075884 A | | 7/2018 | |

*Primary Examiner* — Jerome Grant, II
(74) *Attorney, Agent, or Firm* — Fletcher Yoder, P.C.

(57) ABSTRACT

The current embodiments relate to a real-time automated classification system that uses machine learning system to recognize important moments in broadcast content based on log data and/or other data received from various classification systems. The real-time automated classification system may be trained to recognize correlations between the various log data to determine key moments in the broadcast content. The real-time automated logging system may determine and generate metadata that describe or give information about what is happening or appearing in the broadcast content. The real-time automated logging system may automatically generate control inputs, suggestions, recommendations, and/or edits relating to broadcast content based upon the metadata, during broadcasting of the broadcast content.

20 Claims, 10 Drawing Sheets

(56) References Cited

U.S. PATENT DOCUMENTS

| | | |
|---|---|---|
| 2009/0210364 A1 | 8/2009 | Adi et al. |
| 2015/0175940 A1 | 6/2015 | Wells et al. |
| 2017/0228618 A1 | 8/2017 | Jiang et al. |
| 2018/0048865 A1 | 2/2018 | Taylor et al. |
| 2019/0197187 A1 | 6/2019 | Zhang et al. |
| 2019/0200076 A1 | 6/2019 | Sanchesshayda et al. |
| 2019/0346929 A1 | 11/2019 | Misra et al. |
| 2019/0354759 A1 | 11/2019 | Somers et al. |
| 2020/0035222 A1 | 1/2020 | Sypniewski et al. |

\* cited by examiner

| RAW DATA 43f | CATEGORY 43g | RAW DATA 43h |
|---|---|---|
| 2018-05-11 08:34:21.15 PCR1 PROGRAM:CAM-01,CAM-02,CAM-03<br>2018-05-11 12:01:50.20 CAM-01 IS NOW ON-AIR IN PCR1<br>2018-05-11 12:01:50.21 CAM-01 IS NOW ON-AIR 44c | | |
| 2018-05-11 08:34:24.05 PPK1FILL HAS SELECTED SOURCE CHY2<br><br>45d | CAMIO LOG (CG) | 2018-05-11 08.34.21.731 <-CNBC(86)-ADD STORY 45e<br>2018-05-11 08.34.21.731 ^-NAME CHIP ONLY<br>2018-05-11 08.34.21.731 ^-STORY ID 1427949473201<br>2018-05-11 08.35.02.072 ^-BJ><OBJID>DAYSIDE*05847<<br>2018-05-11 08.35.02.072 ^-1605847)(CHIP TECH DRIVERS)- |
| 2018-05-11 08:34:29.12 PPK1FILL HAS SELECTED SOURCE PROA<br><br>47b | | |
| 2018-05-11 08.34.31.06 PCR1 PROGRAM:CAM-01,RS11 48b<br>2018-05-11 08.34.31.06 CAM-01 IS NOW ON-AIR IN PCR1<br>2018-05-11 08.34.31.06 RS11 IS NOW ON-AIR 2018-05-11 12:01:50.23<br>2018-05-11 08.34.31.06 CHY2 IS NOW ON-AIR 2018-05-11 12:01:50.23 | | |
| 2018-05-11 08.34.49.001 <-CNBC(88)-UPDATE STORY<br>2018-05-11 08.34.49.001 ^-STORY ID 487864525<br>2018-05-11 08.34.49.001 ^-MORROW /7/A/ALEX/TURKELTAUB/<br>2018-05-11 08.34.49.001 ^-/OMS:SSG-HIP-TURKELTAUB-ALEX/SQUAW<br>2018-05-11 08.34.49.001 ^-K BOX BLUE.PNG /< /OBJSLUG><br>2018-05-11 08.34.49.001 ^-BJ><OBJID>DAYSIDE*05750< /OBJID><<br>2018-05-11 08.34.49.001 ^-160575)(LOVE LOCATOR)-LIVE /SAN<br>2018-05-11 08.34.49.001 ^-G><MOSITEMEDITORPROGID>CHYMOX.<br>2018-05-11 08.34.49.001 ^-TEMEDITORPROGID><MOSABSTRACT> 49b | TALLY LOG | 2018-05-11 08.34.49.01 PPK1FILL HAS SELECTED SOURCE CHY1<br>2018-05-11 08.34.49.01 PPK1FILL HAS SELECTED SOURCE CHY3<br><br><br><br><br><br><br><br>49c |
| 2018-05-11 08.35.02.072 ^-MEDIA<MOS><MOSID>CAMIO4</MOSID><br>2018-05-11 08.35.02.072 ^-BJ><OBJID>DAYSIDE*05847</OBJID><<br>2018-05-11 08.35.02.072 ^-1605847)(HSR 2 BULLETS)-ABOUT ROAM<br>2018-05-11 08.35.02.072 ^-|ALPLATFORM FOR HEALTH CARE|FOUNDED<br>2018-05-11 08.35.02.072 ^-MOSITEMEDITORPROGID>CHYMOX.ASSET<br>2018-05-11 08.35.02.072 ^-MEDITORPROGID><MOSABSTRACT>(160584 | TALLY LOG 50b | 2018-05-11 08.35.02.07 PPK1FILL HAS SELECTED SOURCE CHY<br><br><br><br><br>50c |
| 2018-05-11 08.34.22.155 ^-MEDIA<MOS>\R\N\T\T<MOSID>CYCLONE<<br>2018-05-11 08.34.22.155 ^-ROGID>CYCLONE.MOSPLUGIN</MOSITEMED<br>2018-05-11 08.34.22.155 ^-MOSABSTRACT>AAPL CHARTS FS EXTHRS<br>2018-05-11 08.34.22.155 ^-2018</MOSABSTRACT\R\N\T\T<PLUGIN><br>2018-05-11 08.34.22.155 ^-<TEMPLATE>00000000000000000000000002<br>2018-05-11 08.34.22.155 ^-TYPE>CUSTOM</TYPE>\R\N\T\T<DATA><<br>2018-05-11 08.34.22.155 ^-EUPPER><TEMPLATEID>151<TEMPLATEID><br>2018-05-11 08.34.22.155 ^-0><SHOWEXTHRS>TRUE</SHOWEXTHRS> | TALLY LOG 51b | 2018-05-11 08.35.22.15 PPK1FILL HAS SELECTED SOURCE BRS<br><br><br><br><br><br><br>51c |

FIG. 3B

REAL-TIME AUTOMATED CLASSIFICATION SYSTEM

CROSS-REFERENCE TO RELATED APPLICATIONS

The present application is a continuation of U.S. Non-Provisional patent application Ser. No. 16/128,124, entitled "REAL-TIME AUTOMATED CLASSIFICATION SYSTEM," filed Sep. 11, 2018, which is hereby incorporated by reference in its entirety for all purposes.

BACKGROUND

The present disclosure relates generally to the capturing of human input and actions as metadata in the creation of broadcast and video content and, more particularly, to machine learning of real-time data logging associated with broadcast and video content.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Exclusive logging systems are used to collect data across the many platforms used in the creation of broadcast content and other video content for tracking, recording, and monitoring associated with the creation and manipulation of the content. These logging systems collect a tremendous among of log data related to the broadcast content, for example. In particular, log data may include data from various devices or systems used during the creation of broadcast content. This data is rarely accessed because log data is principally used by engineers to determine faults and errors. Traditionally, broadcast content is analyzed manually (e.g., by human analysts) to identify significant elements in the broadcast content. Based on the analysis, metadata fields are entered manually into predetermined fields, and suitable edits may be manually determined and/or added to generate enhanced broadcast content. For example, the audiences may receive the broadcast content with added captioning, added video clips, added commentaries, additional links, etc. to complement the broadcast content. However, the traditional manual approach to characterize broadcast content and/or produce the edited broadcast content may be labor intensive, time-consuming, inconsistent, and inefficient.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The current embodiments relate to systems and methods for real-time automated classification of content (e.g., broadcast content or other video content) using existing data, such as data from various logging systems. For example, the current embodiments relate to a real-time automated classification system, where a machine learning system is used to recognize important moments in broadcast content based on log data and/or other data received from various classification systems. In an aspect, the real-time automated classification system may be trained to recognize correlations between the various log data to determine what is happening in the broadcast content (e.g., a host/anchor is speaking, a scoring moment in a sports game). Specifically, the real-time automated logging system may determine and generate metadata that describe or give information about what is happening or appearing in the broadcast content. In addition, the real-time automated classification system may automatically generate control inputs, suggestions, recommendations, and/or edits relating to broadcast content (e.g., supplemental elements to be incorporated in the live broadcast, such as graphic elements, automated clips, reports, analyses, texts, captions, labels, and any other suitable supplemental elements). Accordingly, the real-time automated classification system may generate broadcast content in real-time more efficiently and effectively (e.g., using log information from one or more classification systems).

DRAWINGS

These and other features, aspects, and advantages of the present disclosure will become better understood when the following detailed description is read with reference to the accompanying drawings in which like characters represent like parts throughout the drawings, wherein:

FIG. 3A and FIG. 3B illustrate a table illustrating the correlation of log data with a tally log based on the master timing provided by the tally log, in accordance with an embodiment of the present disclosure.

Figure 1:
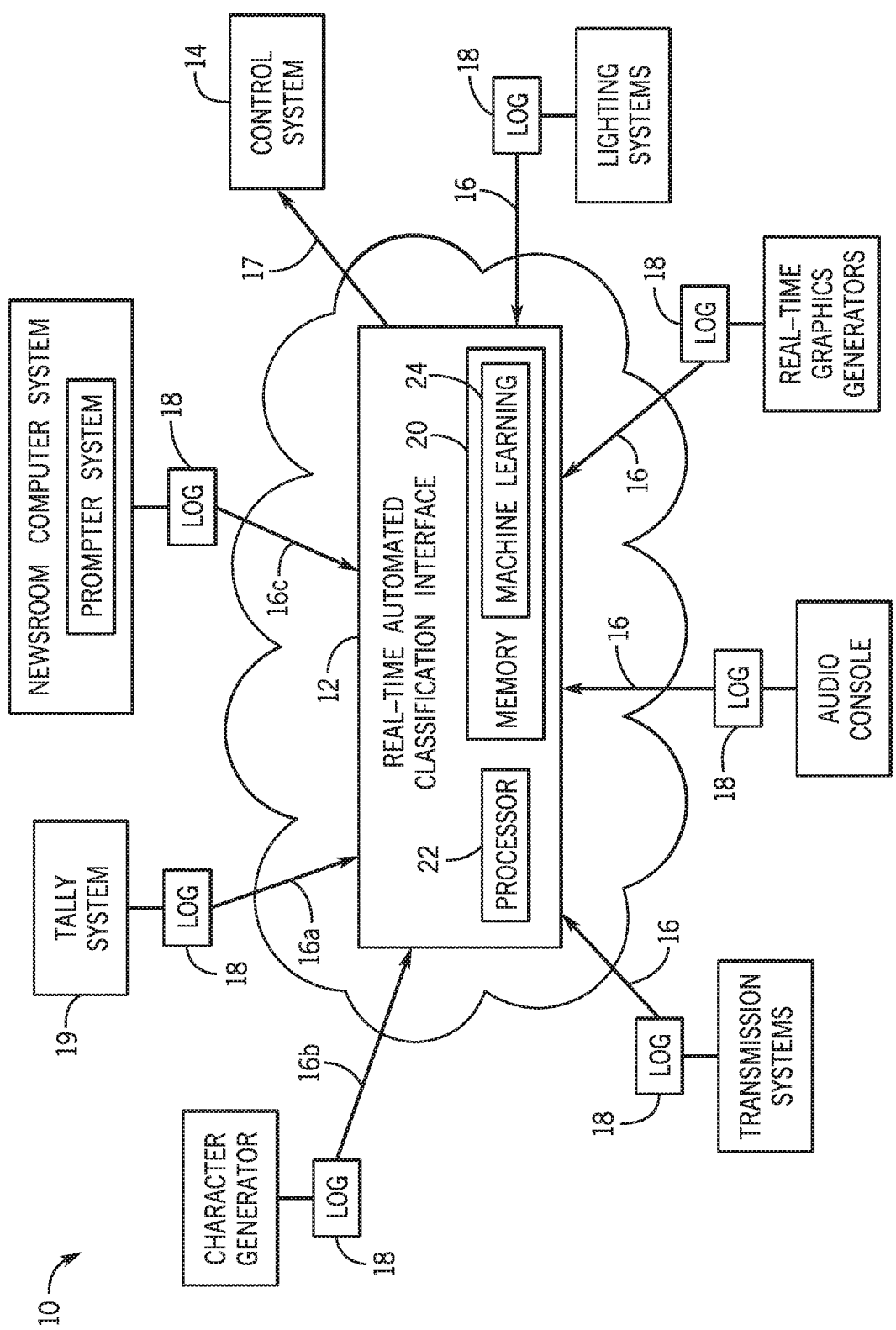
FIG. 1 is a schematic view of a real-time automated classification system for broadcast content, in accordance with an embodiment of the present disclosure.
Figure 8:
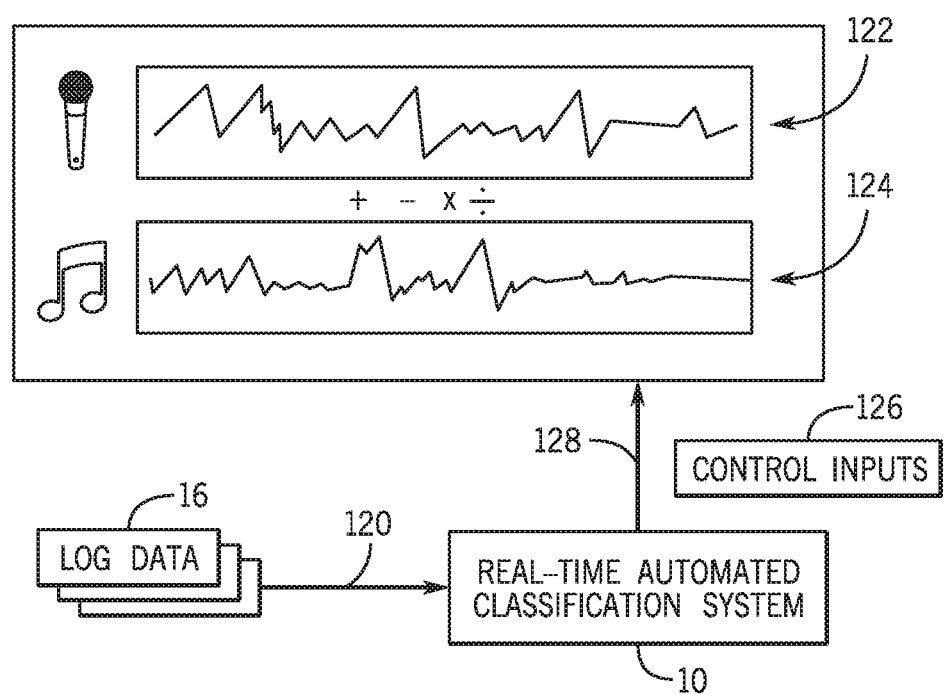
Figure 9:
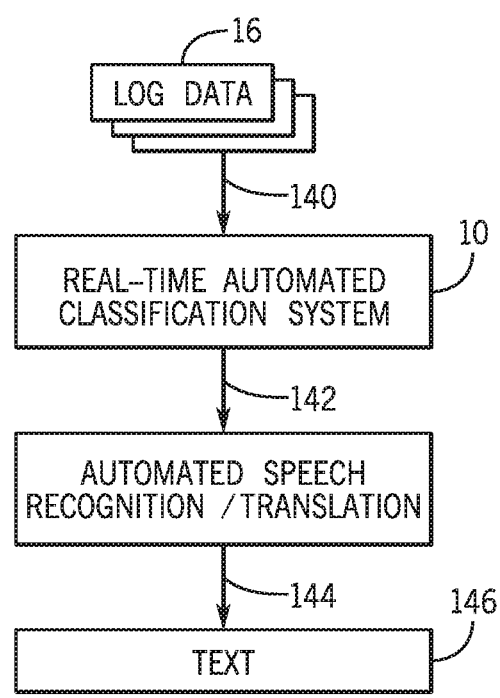

FIG. 8 is a schematic illustrating an example of the real-time automated classification system of FIG. 1 providing an automated control relating to broadcast content, in accordance with an embodiment of the present disclosure; and FIG. 9 is a schematic illustrating an example of the real-time automated classification system of FIG. 1 providing an automated text file relating to broadcast content, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, there exists an opportunity to more efficiently log data and provide control inputs, suggestions, and/or edits to broadcast content. By machine learning of log data relating to creation of broadcast content, various processes of generating the content (e.g., broadcast content) may be automated, rather than performed manually, resulting in significant time-savings. Indeed, the time efficiencies provided by the current techniques may result in new offerings that are impossible to provide in time-sensitive broadcasting. For example, future consumer demand may require the ability to adapt live broadcast content into digital formats for viewing. Moreover, in certain types of broadcasts, such as live broadcasts, there is a limited amount of time available to edit content before the content is to be broadcasted. By performing real-time and/or rapid classification of content, crucial time is saved, enabling additional and/or better storytelling, journalism, and overall compilation of the broadcast content. Accordingly, a real-time automated classification system in accordance with the present embodiments may substantially reduce the time it takes to process a tremendous amount of log data and to improve the efficiency of compiling broadcast content as well as other broadcast enterprise functions related to the creation of assets, resulting in higher quality broadcasts with more enhanced output of content.

Turning now to a more detailed discussion of the real-time automated classification system, FIG. 1 is a schematic view of a real-time automated classification system 10, in accordance with an embodiment of the present disclosure. As illustrated, the real-time automated classification system 10 may be a cloud-based system and may include a real-time automated classification interface 12 and a control system 14 communicatively coupled to the real-time automated classification interface 12. The real-time automated classification interface 12 may include suitable wired and/or wireless communication interfaces configured to receive log data 16 from logging systems 18. The log data 16 may include a tremendous amount of data generated during creation of video content, such as during a live broadcast event (e.g., sports game, talk show, news reporting).

In general, the log data 16 include data from data loggers that log operations of devices and/or systems (e.g., character generators (CGs), newsroom computer systems, prompter systems, audio consoles, real-time graphics generators (e.g., generators of charts and/or other data representations), transmission systems, and lighting systems) contributing to capturing or broadcasting video content of an event. The log data 16 may include, but are not limited to, time code information, text information, system state data, audio console log(s), real-time graphic system log(s), tally log(s), switcher log(s), news room control system log(s) (e.g., iNews logs), Media Object System (MOS) gateway log(s), video replay log(s), and/or video playout log(s). For example, given the extended recording times of data loggers, there is typically a mechanism to record the date and time in a timestamp to ensure that each recorded data value has a timecode reference with a date and time of acquisition in order to produce a sequence of events. For example, "text information," such as a text log or a text file may be used to log event information (e.g., name of the log file including wildcard characters as appropriate). For example, "audio log(s)" may include physical actions taken by the audio mixer, microphone groupings (or individual microphones) that are open or closed, decibel level, and sound files. As another example, "real-time graphic system log(s)" may include stock and/or commodity symbols, time durations, prices, and formats of requested graphics. As a further example, "tally log(s)" include data indicative of the On-Air status of one or more devices (e.g., camera, individual/multiple CG channel, real-time graphic sources, video playout, AUX input, transmission source, solid state graphics playout systems). Tally logs may be generated by a tally system 19, which may control the tally light and associated indicators that appear on devices as well as multi-viewers associated with the control system 14. As yet another example, "switcher log(s)" provide information on the activities of the technical director, who is responsible for implementing the decisions of the director. More specifically, switcher logs may include data indicative of putting specific cameras, graphics, and transitions on-air. For example, "newsroom system log(s)" may include the rundown, script of a television program, any self-serve graphic information, CG format and text, real-time graphic orders, segment partitions, host/guest information, playout sources and graphic information that are input by a producer or director for each broadcast segment. For example, "Media Object Server (MOS) gateway logs" will display when specific devices are invoked and rendered based on commands of an operator. For example, replay log(s) may include data relating to video "instant" replay of broadcast content. For example, "character generator log(s)" may include data indicative of television graphics that occupy the lower area of the screen or any predominantly text-based video graphic as used by television broadcasts. For example, "video playout log(s)" may include data indicative of operation of playout system(s) that provide indications of when file-based video packages with sound or silent B-roll were utilized during the live broadcast. It should also be noted that the real-time automated classification interface 12 may be configured to receive and accumulate the log data 16 from different types of logging systems 18 and log data 16 from different manufacturers or platforms.

The real-time automated classification interface 12 may include a memory 20 (e.g., a tangible, non-transitory, machine-readable medium) that stores machine readable instructions and may include a processor 22 configured to execute these instructions to control various components of the real-time automated classification system 10. While the illustrated embodiment is described as including the processor 22, in other embodiments, the real-time automated classification interface 12 may include several processors that are each configured to execute instructions stored on the memory 22. The real-time automated classification interface 12 may receive and analyze the log data 16. In some embodiments, the real-time automated classification interface 12 may include a machine learning module or system 24 (e.g., stored in the memory 20). The machine learning module 24 may include any suitable machine learning algorithms to perform supervised learning or semi-supervised learning. Once the machine learning module 24 is trained based on video content, current broadcast content, and/or previously recorded broadcast content, the real-time automated classification interface 12 may provide automated control, automated suggestions, and/or automated reporting 17 based on the log data 16. For example, in the current embodiment, the real-time automated classification interface 12 provides automated control, automated suggestions, and/or automated reporting 17 to the control system 14, which may be used to facilitate broadcast content compilation, create derivative content, and generate multiple "tracks" of graphics output.

By automating the provision of automated control, automated suggestions, and/or automated reporting 17 to the control system 14, time-consuming tasks that have typically required significant human subjectivity can be reduced. For example, automatic topical classification of content may be attributed to content, and automatic B-roll content recommendations, etc. may be provided to the control system 14 in a time-efficient manner not previously seen in this industry. This may result in higher-quality content editing, increased ability to produce live content, and better tailoring of the content to target audiences, etc.

Figure 2:
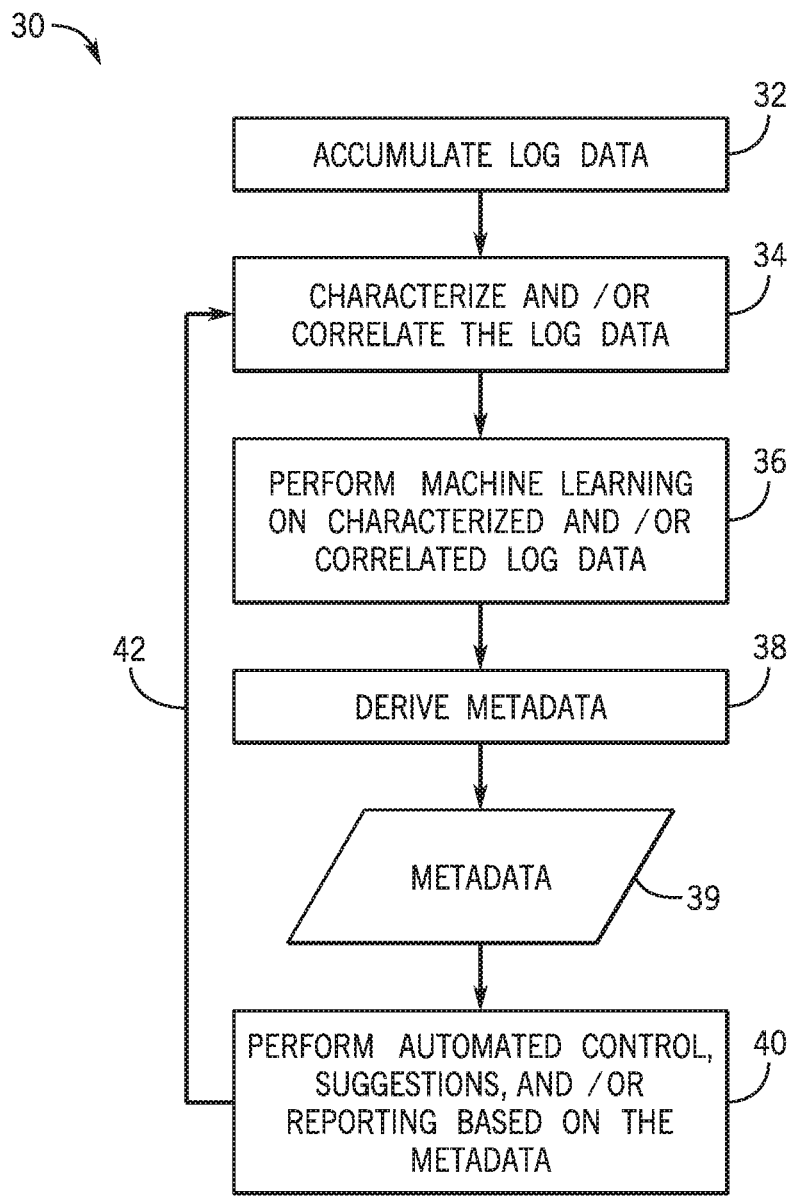
FIG. 2 is a flow diagram illustrating a process in which the real-time automated classification system of FIG. 1 provides automated control, automated suggestions, and/or automated reporting relating to the broadcast content, in accordance with an embodiment of the present disclosure.

FIG. 2 is a flow diagram illustrating a process 30 in which the real-time automated classification system 10 provides automated control, automated suggestions, and/or automated reporting based on the log data 16. One or more operations of the process 30 may be executed by the processor 22 of the real-time automated classification interface 12. Referring to the real-time automated classification system 10 of FIG. 1, the process 30 may include (operation 32) accumulating the log data 16. The real-time automated classification interface 12 may receive and accumulate the log data 16 from the logging systems 18. The log data 16 includes data or information relating to particular devices that are observed during generation of content (e.g., broadcast content). For example, as discussed above, the log data 16 may include, but are not limited to, time code information, text information, audio log(s), real-time graphic system log(s), tally log, switcher log(s), newsroom control system log(s), MOS gateway logs, video replay log(s) and video playout log(s).

The process 30 may include characterizing and/or correlating (operation 34) the log data 16. As set forth above, there may be a tremendous amount of log data 16 created during broadcasting content. As such, the real-time automated classification interface 12 may correlate the log data 16, based on a master source, such as data included in the tally logs. The real-time classification interface 12 may correlate any other log data 16 with the tally logs, and the resulting correlated data can be utilized for the operations in the process 30 described below. Correlating the log data 16 with the tally logs ensures that all of the events are captured for a particular moment in time.

Moreover, correlating the log data 16 with the tally logs enables the implementation of a higher-level taxonomy, which allows a heuristic algorithm to label particular groups of actions. For example, one such grouping might be a "four-box" with lower-third. The "four-box" may represent a switcher output configuration that shows four live cameras on a single screen (e.g., one camera displayed on each of the upper left, upper right, lower left, and lower right). The lower-third may be a textual graphic element that may describe the context of the on-screen action, in which the textual graphic element appears in the lower third portion of the screen. These action groups and their associated labels, enable the machine learning module 24 to perform actions based on the presence of a labeled group. For instance, the machine learning module 24 may use labeled data (e.g., tagged data) to teach the processor 22 how to discover important event groups.

For example, the correlated data may be run through a heuristic algorithm (e.g., an algorithm included in the machine learning module 24), which may tag critical data elements of the log data 16. These critical data elements may represent noteworthy actions within the broadcast. Additionally, the tagged data may be characterized in terms of their types, e.g., time code information, text information, audio log, real-time graphic system log, tally log, switcher log, newsroom control system log, MOS gateway log, video replay log, character generator and video playout log. The tagged data may be mapped into a higher level ontology which would provide more actionable information. For example, the ontology may map a series of correlated log entries into higher-level terms.

The real-time automated classification interface 12 may characterize the log data 16 in terms of their points of origination, e.g., from a camera, from a microphone, from a graphics system, from a newsroom system, from a light system, from an audio system. The log data 16 may also be categorized according to a particular device, e.g., from camera #1, from camera #2, from camera #3, from microphone #1, from microphone #2, from microphone #3. Additionally, the log data 16 may be characterized in terms of one or more formats associated with a particular device, e.g., a video file format, an audio file format, a text format. Furthermore, the log data 16 may be characterized in terms of time information associated with a particular device, e.g., the specific time of day when content (e.g., particular frames of content) was broadcasted and elements that were created and brought to air. The log data 16 may also be characterized by the size of the data. Moreover, the log data 16 may be characterized by the relative importance and/or access frequency of the data, e.g., data frequently analyzed versus data rarely analyzed in a post analysis, data relating to an anchor or show host versus data relating to audiences, data relating to a scoring moment of a sports game. In some embodiments, the log data 16 may be pre-characterized by the machine learning module 24. In some embodiments, the log data 16 may be pre-characterized by authorized users or personnel (e.g., human loggers).

There may exist correlations or relationships between the log data 16. For example, there may be a correlation or relationship between different log data 16 of different types, e.g., the tally log may strongly correlate to the newsroom system log, the switcher log may strongly correlate with graphics log and/or character generator log, and the time code information may strongly correlate to video playout log. There may be correlation by log event timing, which groups events that occur at the same (or around the same) time. For instance, as described above, tally log data 16a provides the master timing function, and any other log data may be correlated to this timing. There may be a correlation or relationship between the log data 16 from a particular device and the relative importance of the data, e.g., the log data 16 from a camera #1 may strongly correlate to activity of an anchor or show host, the log data 16 from microphone #4 may strongly correlate to voice from guests or audiences on broadcast content. There may be a correlation or relationship between the time information and the relative importance of the data, e.g., the log data 16 logged during middle of a sports game may more likely correlate to a scoring moment than the log data 16 logged at the very beginning of the sports game. In some embodiments, the correlations or relationships between the log data 16 may be determined by the machine learning module 24. In some embodiments, the correlations or relationships between the log data 16 may be pre-defined by authorized users or personnel (e.g., by human loggers).

Figure 3A:
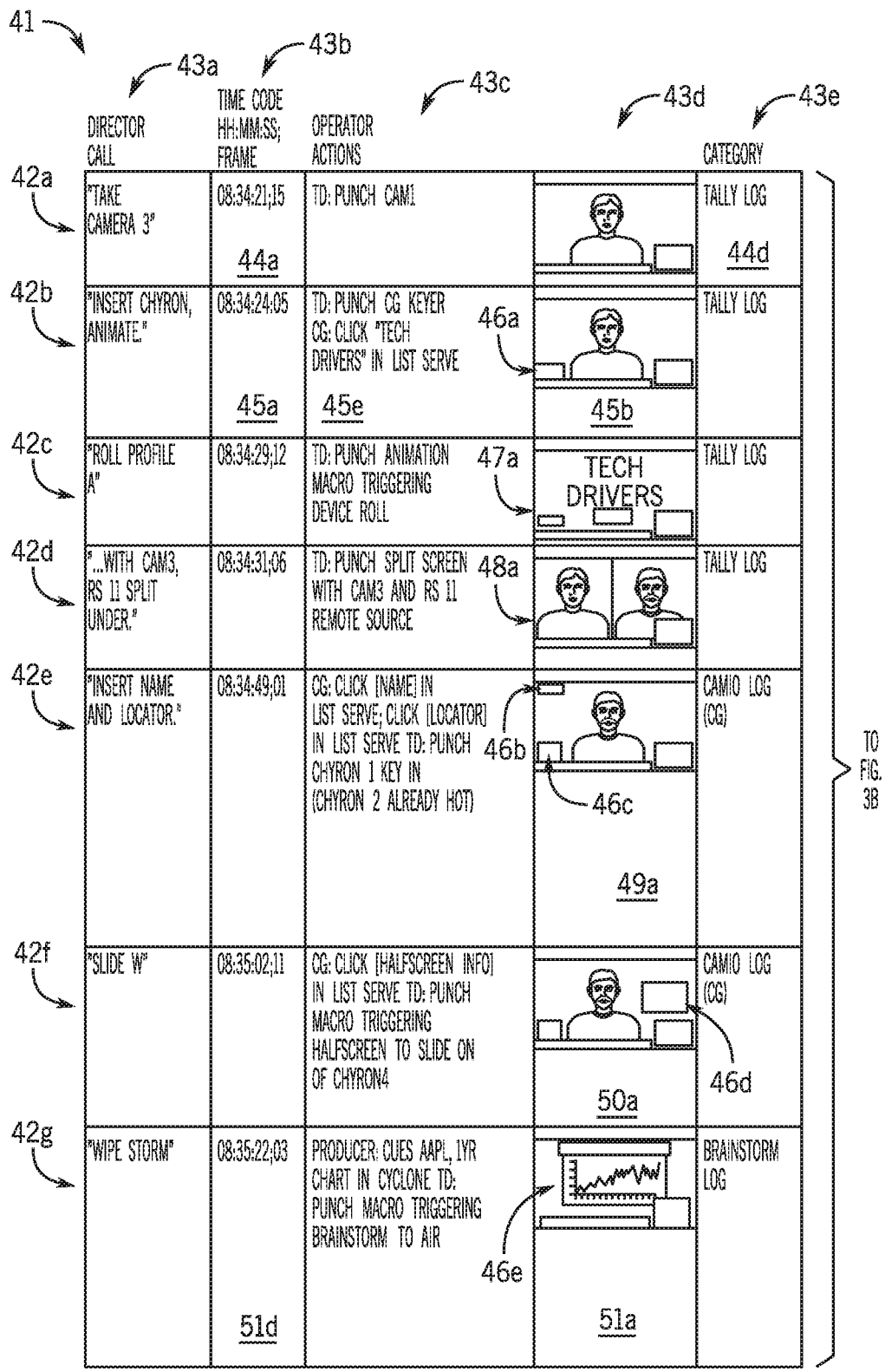

To further illustrate the characterization of log data 16 and correlation of the log data 16 with the tally log, FIG. 3A and FIG. 3B are provided. In particular, FIG. 3A and FIG. 3B are a table 41 illustrating the correlation of log data 16 with the tally log based on the master timing provided by the tally log. As illustrated, the table 41 includes several rows 42 and columns 43. More specifically, each row 42 is associated with particular events at different times. For example, row 42a is associated with a first action or segment of content, while each subsequent row 42 is associated with content that occurs at a time after the content associated with the row 42a. Each of the rows 42 may correspond to an action group. For instance, as discussed below, different types of log data 16 may be included in a row 42, indicating that the log data 16 correlates to one another.

Each of the columns 43 provides information regarding respective columns 42 of the table 41. For instance, column 43a corresponds to events defined in the tally log, which may be referred to as "tally events." Column 43b includes a time and frame associated with a tally event. More specifically, the times and frames indicated in the column 43b are master times with which log data 16 is correlated. Column 43c describes operator actions associated with the times and frames indicated in column 43b. Column 43d includes content that is aired at the time indicated by the column 43b. Column 43e indicates a category of data (e.g., a type of log file that data is included in), and column 43f indicates log data 16 associated with the category of data from column 43e at the time indicated by column 43b. For example, the log data 16 may be data included in the log indicated by the column 43e. Similarly, column 43g indicates another category of log data 16 (e.g., a type of log data that is different than a type of log indicated by column 43e), and column 43h indicates log data 16 associated with the category of data indicated by column 43g at the time indicated by column 43b.

With this in mind, several of the tally events associated with the rows 42 will be discussed. Row 42a is associated with a portion of a broadcast. For instance, at the time indicated by box 44a, the content in box 44b may be broadcasted. That the content was broadcasted is indicated in the log data 16 of box 44c that is associated with the tally log, as indicated by box 44d. For example, the "CAM-01 is now on air in PCR1" indicates that camera #1 was live in the production control room 1, and "CAM-01 is now on air" indicates that the content of box 44b, which was captured from camera #1, was broadcasted. More specifically, the log data 16 also indicates the specific time and frame associated with each item of data.

During the broadcast, different content may be broadcasted. For example, inserts or graphics that are included in the content may be added, changed, or removed. Referring now to row 42b, at the time indicated by box 45a, a graphic 46a has been included in the broadcast, as illustrated in box 45b. The inclusion of the graphic 46a is associated with several operator actions indicated by box 45c. In particular, the graphic 46a may be a CG message that was called from a list serve.

Log data 16 associated with the graphic 46a is also indicated in row 42b. More than one type of log data 16 being included in a row 42, such as row 42b, is indicative of the types of log data 16 being correlated. For instance, the log data 16 from the tally log (indicated by box 45d) indicates that the graphic 46a, which is associated with a character generator, was brought to air at the time indicated in box 45d. Additionally, log data 16 associated with a character generator log, shown in box 45e, indicates that a new story was added, that the graphic 46a was called for (e.g., from the list serve), that an ID was assigned to the story, and that the file for the graphic 46a was retrieved. Although the log data 16 from the CG log is associated with a times before and after the time associated with the log data 16 of the tally log in box 45d, which is also the time indicated by box 45b, the real-time automated classification interface 12 may characterize the log data 16 from the CG log and tally log indicated in row 42b as being correlated to one another. For example, as discussed above, the log data 16 from the CG log is indicative of the graphic 46a being called from a list serve, and the log data 16 from the tally log indicates that the graphic 46a was aired. In other words, the log data 16 from the CG log has been associated with a time indicated by the tally log, and, as noted above, the time from the tally log provides the master time.

Similar to box 46a, box 47a shows that new content (e.g., "tech drivers") aired. As indicated by box 47b, the tally log includes data indicating the source of the new content.

As content or the source or content changes, the tally log may reflect the changes in the log data 16 of the tally log. For example, content captured from another camera or source may be used in addition to, or instead of, a camera or source previously used. For instance, as illustrated in box 48a, a split screen is utilized to show people who are filmed from two different sources. Moreover, as shown in box 48b, the log data 16 from the tally log indicates that content was aired from two sources (i.e., camera #1 and an address of a router switcher (RS11) associated with a remote source). The log data 16 also indicates that the graphic 46a was aired, as shown in the content of box 48a.

As another example of correlating log data 16 to the master time provided by the tally log, the content of box 49a corresponds to a change in content being aired. More specifically, graphic 46b and graphic 46c were added to the broadcast content. As indicated in box 49b, the CG log includes log data 16 indicating that a story has been generated and assigned an ID. The CG log data 16b also indicates text included in the graphic 46b and graphic 46c as well as the file locator for the background of the graphics 46b and 46c. Moreover, as indicated by the log data 16 from the CG log being included in the row 42e with the tally log data 16a (shown in box 49c), CG log data 16b has been correlated with the tally log data 16a, which indicates that the graphic 46b and graphic 46c were brought to air.

As a further example of correlating log data 16, the content of box 50a depicts that a graphic 46d has been added to the content. Similar to the previous example, log data 16 from the CG log has been correlated with log data 16 from the tally log. For example, log data 16 from the CG log is indicative of the graphic 46d (e.g., text included in the graphic 46d and file locator(s) for the graphic 46d). The log data 16 from the tally log indicates that the graphic 46d was aired.

As yet another example of correlating log data 16, the content of box 51a corresponds to a change in content being aired. In particular, a graphic 46e has been added to the broadcast content. As indicated in box 51b, log data 16 from a real-time graphics generator indicates that a stock chart (e.g., graphic 46e) has been ordered (e.g., for addition into the broadcast content). The tally log data 16a included in box 51c indicates that the real-time graphics generator was brought to air. Additionally, as indicated by the log data 16 from the real-time graphics generator log and tally log being included in the row 42g, the log data 16 from the real-time graphics generator log has been correlated with tally log data 16a. For instance, the tally log data 16a and log data from the real-time graphics generator log may be correlated to the master time indicated within box 51d. Moreover, because the tally log data 16a indicates that the real-time graphics generator was brought to air at the time indicated in box 51d, and the log data 16 from the real-time graphics generator indicates the content (e.g., graphic 46e) associated with the real-time graphics generator at the time indicated in box 51d, the row 42g generally indicates that the graphic 46e was aired at the time indicated by box 51d.

The examples of correlated data discussed above with regard to FIG. 3A and FIG. 3B largely relate to cases in which one set of log data 16 (e.g., a CG log) indicates information about content (e.g., data regarding graphics 46a-46d) and another set of log data 16 (e.g., a tally log) indicates that the content was aired. However, it should be noted that the real-time automated classification system 10 may determine correlations between other types of log data 16 as well as correlations between more than two types of log data. For example, a character generator may be used to add one graphic to broadcast content at the same or a similar time as when another real-time graphics generator adds another graphic to the broadcast content. In such a case, log data 16 from a CG log data, a real-time graphic system log, and a tally log may be correlated to one another. Additionally, the real-time automated classification system 10 may determine correlations between log data 16 that are not apparently related to or apparently correlated to one another. For example, the real-time automated classification system 10 may determine correlations that a human is unable to discover.

Referring back to FIG. 2, the process 30 may include performing (operation 36) machine learning on the characterized and/or correlated log data 16. The machine learning module 24, when executed by the processor 22, may be configured to automatically perform various tasks associated with the machine learning module 24 to perform validation and/or training of the machine learning module 24. For example, the machine learning module 24 may be trained on training data to improve accuracies of characterizing the log data 16 and determining correlations or relationships between the characterized log data 16. The training data may include previous or historical log data 16 associated with previous or historical broadcast content. The training data may include inputs or updates provided by the authorized users or personnel. In some embodiments, the log data 16 may come from devices and/or systems from different manufacturers or platforms, and the machine learning module 24 may be trained to more accurately characterize the log data 16.

The process 30 includes deriving (operation 38) metadata 39 related to the creation of the broadcast content. The metadata 39 may include descriptions of or give information about what is happening in the broadcast content. In particular, the machine learning module 24, when executed by the processor 22, may be configured to automatically perform various tasks associated with the machine learning module 24 to generate the metadata 39 for the corresponding live or pre-taped broadcast content. For example, the machine learning module 24 may be configured to generate the metadata 39 based on the learned characterized and/or correlated log data 16. For instance, referring briefly to FIG. 3A and FIG. 3B, the metadata 39 may indicate, among other things, broadcast content that included one or more characteristics. For instance, the metadata may indicate content that a person (e.g., a host or guest) appeared. For example, the metadata may indicate that a guest appeared (e.g., in content associated with box 48a) and/or the specific guest that appeared. As another example, the metadata may indicate that the broadcast content included graphics (e.g., graphics 46a-e) or specific characteristics of the graphics 46a-e themselves. For instance, metadata may be generated to indicate the graphic 46e is a stock chart, includes information regarding a specific company, and/or a time period associated with the stock chart (e.g., particular dates and/or an amount of time). As yet another example, the metadata may indicate that particular log data 16 is correlated to other log data 16 as well as how the log data 16 are correlated to one another (e.g., correlated by a time defined by the tally log).

Referring back to FIG. 2, the process 30 includes performing (operation 40) automated control, automated suggestions, and/or automated reporting based on the metadata 39. The machine learning module 24, when executed by the processor 22, may be configured to automatically generate control inputs, suggestions, and/or reports for the broadcast content, for example, based on the derived metadata 39 in operation 38. For example, the machine learning module 24 may enhance the generation of and/or selection of graphic elements, clips, reports, analyses, texts, captions, labels, control inputs, etc. The real-time automated classification system 10 may distribute the generated control inputs, suggestions, and/or reports to suitable receiving systems. For example, depending on content of the control inputs, suggestions, and/or reports, the real-time automated classification system 10 may broadcast the control inputs, suggestions, and/or reports along with the broadcast content, distribute the control inputs, suggestions, recommendations, and/or edits to authorized personnel (e.g., a producer, an editor, a show host or anchor of the broadcast content), or both. In some embodiments, the generated control inputs, suggestions, and/or reports are reviewed and/or approved prior to being broadcasted and/or distributed. For example, the real-time automated classification system 10 may receive an approval from an authorized personnel regarding the content of the generated control inputs, suggestions, and/or reports, and in response to receiving the approval, the real-time automated classification system 10 may broadcast and/or distribute the generated control inputs, suggestions, and/or reports. In some embodiments, the automated control, automated suggestions, and/or automated reporting performed based on the metadata performed in operation 38 may be added to training data of the machine learning module 24. As such, the machine learning module 24 may be trained and/or updated to (e.g., as indicated by an arrow 42) to improve the accuracy of characterizing and/or correlating the log data 16, which in turn may result in improved (e.g., more accurate) prediction/generation of automated control, automated suggestions, and/or automated reporting in operation 40. For example, the machine learning module 24 may determine, as a form of feedback, whether suggested content/input is accepted by a user. If suggested content/input based on certain observations (e.g., O1 and/or O2) are often accepted, then those content/input and/or corresponding observations may be more relevant and assigned greater weight values, for example. By contrast, if suggested content/input based on the observations are rarely, if ever, accepted, then those suggestions may be less meaningful, and the suggestions and/or observations may be assigned smaller weight values or eliminated in the future.

As discussed in detail herein, the metadata 39 generated in operation 38 and the performed control, suggestion, and/or reporting in operation 40 of FIG. 2 may be determined in part or in whole based upon machine learning. The metadata 39 may have any suitable format to describe or give information about what is happening in the broadcast content. To perform the machine-learning, observation data may be used to enable the machine to make predictions regarding the broadcast content, such that the metadata 39 may be derived and/or to make predictions regarding particular actions to perform, suggestions to provide, generate derivative content and/or alternate graphics, or report data to provide.

Figure 4:
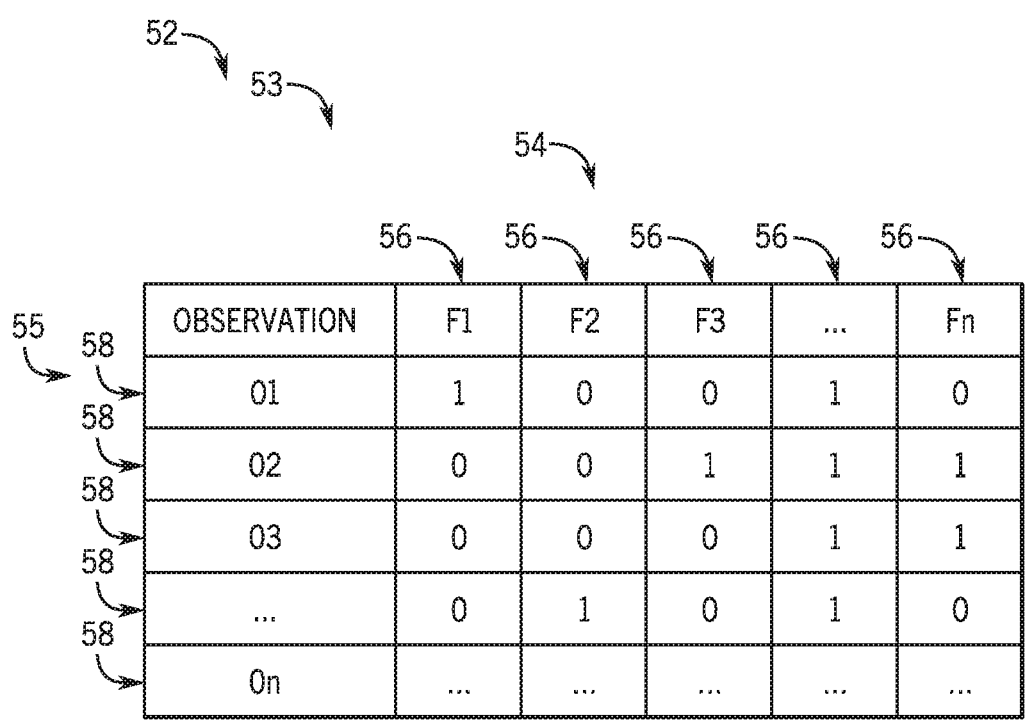
FIG. 4 is a schematic illustrating a format of a machine-learning observation data for factorization of observations of broadcast content, in accordance with an embodiment of the present disclosure.

FIG. 4 is a schematic illustrating an example format of a machine-learning observation data 52, which provides factorized observations of the broadcast content that may be generated by the real-time automated classification interface 12. As illustrated, the machine-learning observation data 52 may include a feature table 53 of features 54 and observations 55 that the machine learning module 24 may interact with. The features 54 may relate to particular characterizations of the log data 16. For example, the features 54 may include a feature "F1" corresponding to an anchor microphone activation status, a feature "F2" corresponding to a camera #1 activation status, a feature "F3" corresponding to a tally light activation status, etc. Other features from the log data 16 may also be provided as features. For example, graphics channels, newsroom system output, tally logs, etc. may be provided as features. Further, because the log data 16 are aggregated, coordination features that provide an indication of how two or more devices are working together may be provided, such as a feature that indicates that a broadcast content active shot from camera #1 was recently switched to from camera #2. As another example, the coordination features may indicate that a certain CG message was called up by an operator from a list serve, and the tally system 19 indicated (e.g., in the tally log) that the CG message was actually brought to air (e.g., as illustrated in rows 42b, 42d, and 42e of FIG. 3A and FIG. 3B). There are groups of actions that may correlated based on tally log timing, as described above. These action groups may map to ontologies, which may also provided as features 54 in the feature table 53.

As such, each column 56 relates to a specific feature. The observations 55 may relate to metadata results for particular combinations of features 54 and/or observations of the control, suggestions, and/or reporting for the broadcast content for a given combination of features 54. For example, from a metadata context, the observation "O1" could represent combinations of features 54 present when an anchor is present in the active shot (or when a particular Anchor X is in the active shot). Further, from a control, suggestion, and/or reporting context, the observations 55 may include an observation "O1" corresponding to a video clip inserted in the broadcast content, an observation "O2" corresponding to a graphic presentation inserted in the broadcast content, an observation "O3" corresponding to a text file of speech translation, etc. As such, each row 58 relates to a specific observation.

Each row 58 provides combinations of the features (e.g., F1, F2, F3 . . . Fn) and an indication of whether or not the feature is present at a particular time or during a particular period of time in the content. A specific feature includes a "1" if data relating to the feature is present and a "0" if the feature is not present. For example, in an observation "O1", the feature "F1", related to an anchor microphone, is set to "1", indicating that the anchor microphone is active. Further, in the observation "O1" related to a camera #2 (e.g., "F2"), the "0" indicates that the camera #2 is off. All of the features 54 and observations 55 in the feature table 53 are expressed in this manner to enable the machine learning module 24 to predict derived metadata and/or control actions, suggestions, and/or reporting content, using combinations of features present in log data 16, without requiring human evaluation or subjectivity.

As indicated above, each of the observations may pertain to a specific time or a period of time. For example, an observation may pertain to a time indicated in the tally log, and a row 58 associated with that observation may indicate whether data relating to particular features (e.g., as indicated in columns 56) was present at that time. An observation may also relate to a period of time, such as a period of time that occurs between two times indicated in the tally log data 16a. For instance, feature "F1" may relate to a status as to whether a graphics generator has received a request for a particular graphic, and feature "F2" may pertain to whether the graphics generator has provided the requested graphic.

Figure 5:
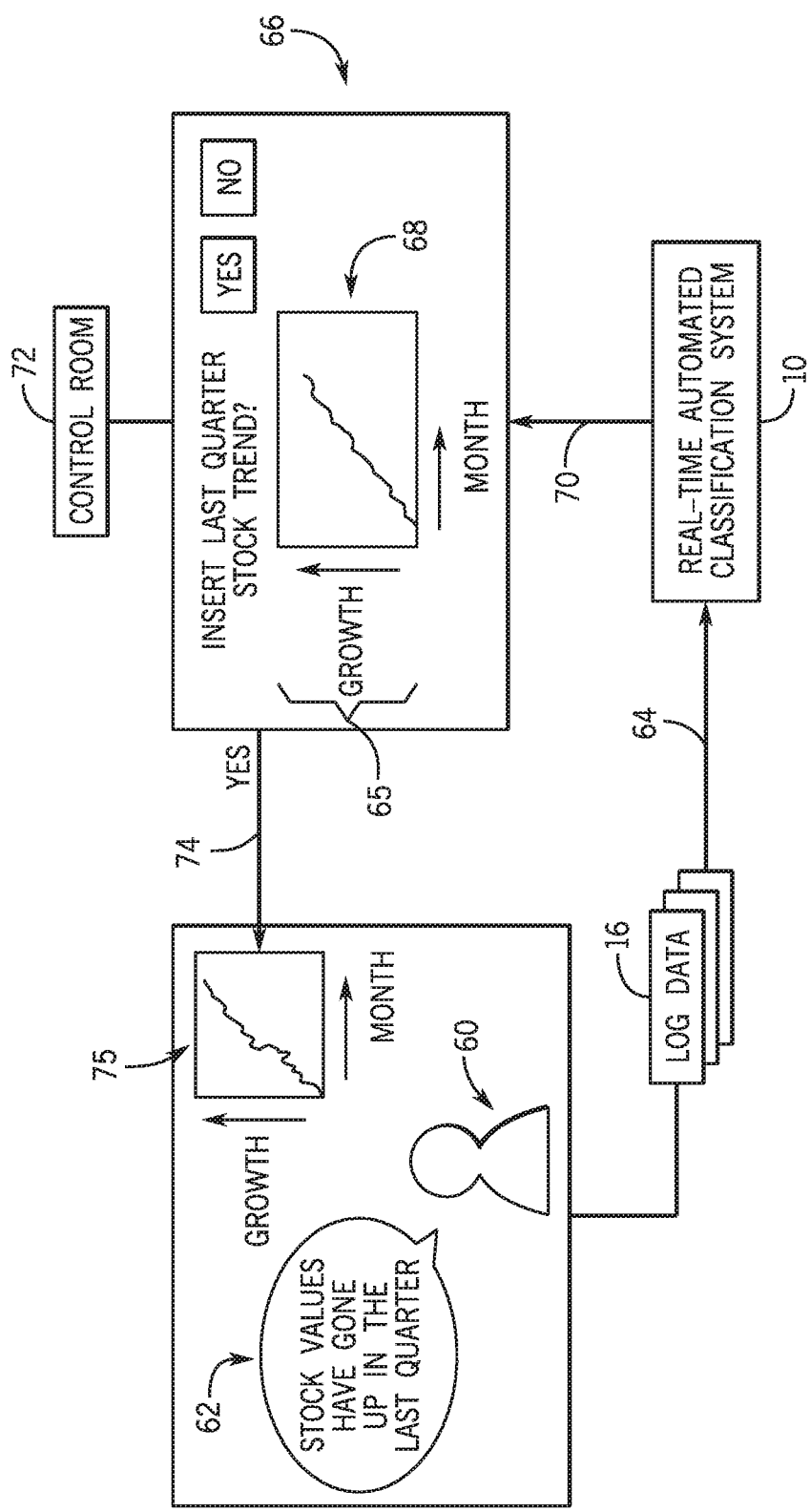
FIG. 5 is a schematic illustrating an example of the real-time automated classification system of FIG. 1 providing an automated suggestion relating to broadcast content, in accordance with an embodiment of the present disclosure.

As mentioned above, the real-time automated system 10 may provide enhancement to automated control, automated suggestions, and/or automated reporting based on the log data 16. FIGS. 5-8 below illustrate examples of manners that the real-time automated system 10 may generate and provide automated control, automated suggestions, and/or automated reporting relating to the broadcast content. FIG. 5 is a schematic illustrating an example of the real-time automated classification system 10 of FIG. 1 providing an automated suggestion relating to broadcast content. In the illustrated embodiment, a news reporter 60 is reporting news 62 relating to stock market. The log data 16 is received and/or accumulated by the real-time automated classification system 10 as indicated by an arrow 64. The real-time automated classification system 10 may derive metadata 39 based on the log data 16. In the illustrated example, the metadata 39 may include information that allows the real-time automated classification system 10 to determine that a particular portion of the broadcast content (e.g., news 62) includes information indicating "stock values have gone up in the last quarter." In response to such determination, the real-time automated classification system 10 may provide (arrow 70) suggestions 65 relevant to what is happening in the broadcast content. For example, the real-time automated classification system 10 may generate and provide the suggestions, such as a graphical user interface (GUI) 66 including a graphic presentation 68 showing the stock performance or trend in the last quarter(s).

The real-time automated classification system 10 may provide (e.g., as indicated by an arrow 70) the suggestions 66 to be reviewed or approved prior to incorporation of the suggestions 65 in the broadcast content. For example, the suggestions 65 may be received at a control room 72, which has an option of accepting or denying the suggested graphic presentation 68. In response to the suggestions 65 being accepted, the real-time automated classification system 10 may automate instructions to incorporate or insert B-roll content 75 in the broadcast content as indicated by an arrow 74. As such, audiences viewing the broadcast content may receive the news 62 as well as the B-roll content 75 relating to the news 62 in real-time. In some embodiments, upon generation of the suggestions 65, the real-time automated classification system 10 may automate instructions to incorporate the suggestions 65 in the broadcast content without a confirmation (e.g., confirmation of acceptance from an authorized personnel or the control room 72). That is, the real-time automated classification system 10 may alter the broadcast content by automatically incorporating the suggestions 65 into the broadcast content. It should be noted that the processes set forth above in FIG. 5 may occur real-time or substantially real-time with respect to the live broadcasting.

Figure 6:
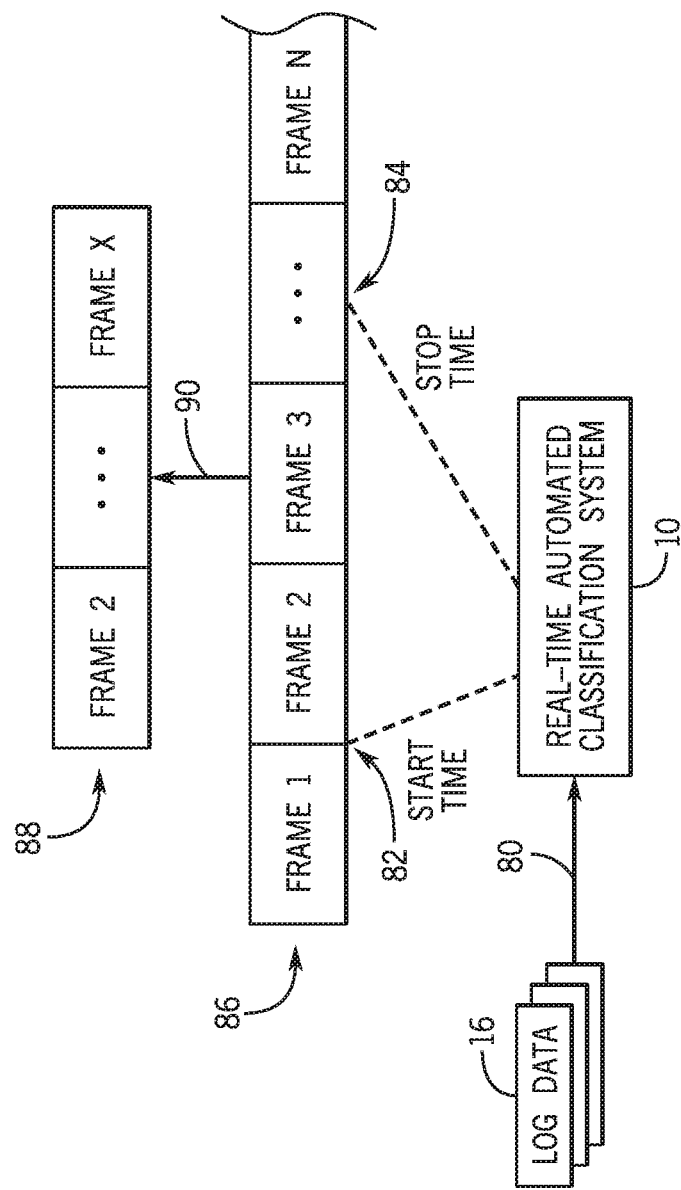
FIG. 6 is a schematic illustrating an example of the real-time automated classification system of FIG. 1 providing an automated clip relating to broadcast content, in accordance with an embodiment of the present disclosure.

FIG. 6 is a schematic illustrating an example of the real-time automated classification system 10 of FIG. 1 providing an automated clip relating to broadcast content. In the illustrated embodiment, the log data 16 is received and/or accumulated by the real-time automated classification system 10 as indicated by an arrow 80. The real-time automated classification system 10 may derive the metadata 39 based on the log data 16. In the illustrated example, the metadata 39 may include information that allows the real-time automated classification system 10 to determine that a particular portion of the broadcast content includes a "key moment" or a "highlight moment." For example, in the case of live broadcasting a sports game, a scoring moment may be a key moment. The real-time automated classification system 10, in particular the machine learning module 24, may be trained to recognize correlations or relationships in the metadata 39 to recognize a key moment in the broadcast content. For example, the machine learning module 24 may determine that a key moment may strongly correlate with the metadata 39 including information indicating a particular camera or multiple cameras have zoomed to a particular area or player(s) on the field, information indicating increasing cheering volume of the audiences, information indicating a commentator is commenting relating to a scoring moment, etc. In response to determining a key moment, the real-time automated classification system 10 may automate instructions to auto-clip a portion (e.g., one or more frames) of the broadcast content corresponding to the determined key moment. For example, the real-time automated classification system 10 may determine a start time 82 and a stop time 84 in an original or un-clipped live broadcast content 86, such that the content between the start time 82 and the stop time 84 corresponds to the key moment. The real-time automated classification system 10 may generate (as indicated by an arrow 90) auto-clipped segments 88 that correspond to the key moment (e.g., from the start time 82 to the stop time 84). The real-time automated classification system 10 may automate instructions to incorporate or insert the auto-clipped segments 88 as "re-play" or "highlight" at a suitable time (e.g., a short period after the scoring moment, as the commentator is commenting on the scoring moment). As such, audiences viewing the broadcast content may receive the live sports broadcast as well as the auto-clipped segments 88 as re-play or highlight of the key moment. It should be noted that the processes set forth above in FIG. 6 may occur real-time or substantially real-time with respect to the live broadcasting.

In another aspect, it should be noted that the auto-clipped segments 88 may be tagged for distribution (e.g., via an over-the-top (OTT) media provider, a mobile network, enhanced cable). For example, the auto-clipped segments 88 may be provided via a digital distribution network (e.g., an OTT media provider, a mobile network, enhanced cable) while the program from which the auto-clipped segments were taken is still airing. Moreover, some of the auto-clipped segments 88 may be provided before all of the auto-clipped segments have been identified. For instance, the real-time automated classification system 10 may determine that a topic is being discussed during a live broadcast and treat the discussion of the topic as a key moment. Accordingly, the real-time automated classification system 10 may auto-clip segments from the content as the content is occurring live. In another aspect, while the content is still airing and while the real-time automated classification system 10 continues to generate auto-clipped segments 88 related to the topic, already identified segments from the auto-clipped segments 88 may tagged for distribution and distributed via a digital distribution network. Viewers of the distributed auto-clipped segments 88 may interact with the content (e.g., rewind) while the topic is still being discussed on the live broadcast and before at least a portion of the segments of content that the real-time automated classification system 10 ultimately determines are related to the topic are included as auto-clipped segments 88. In yet another aspect, the real-time automated classification system 10 may also tag auto-clipped 88 segments with descriptors such as a sports highlight or a key news event of the day, which may enable the system to automatically search for a particular category of tags for automated distribution via the different channels mentioned at a designated time.

Figure 7:
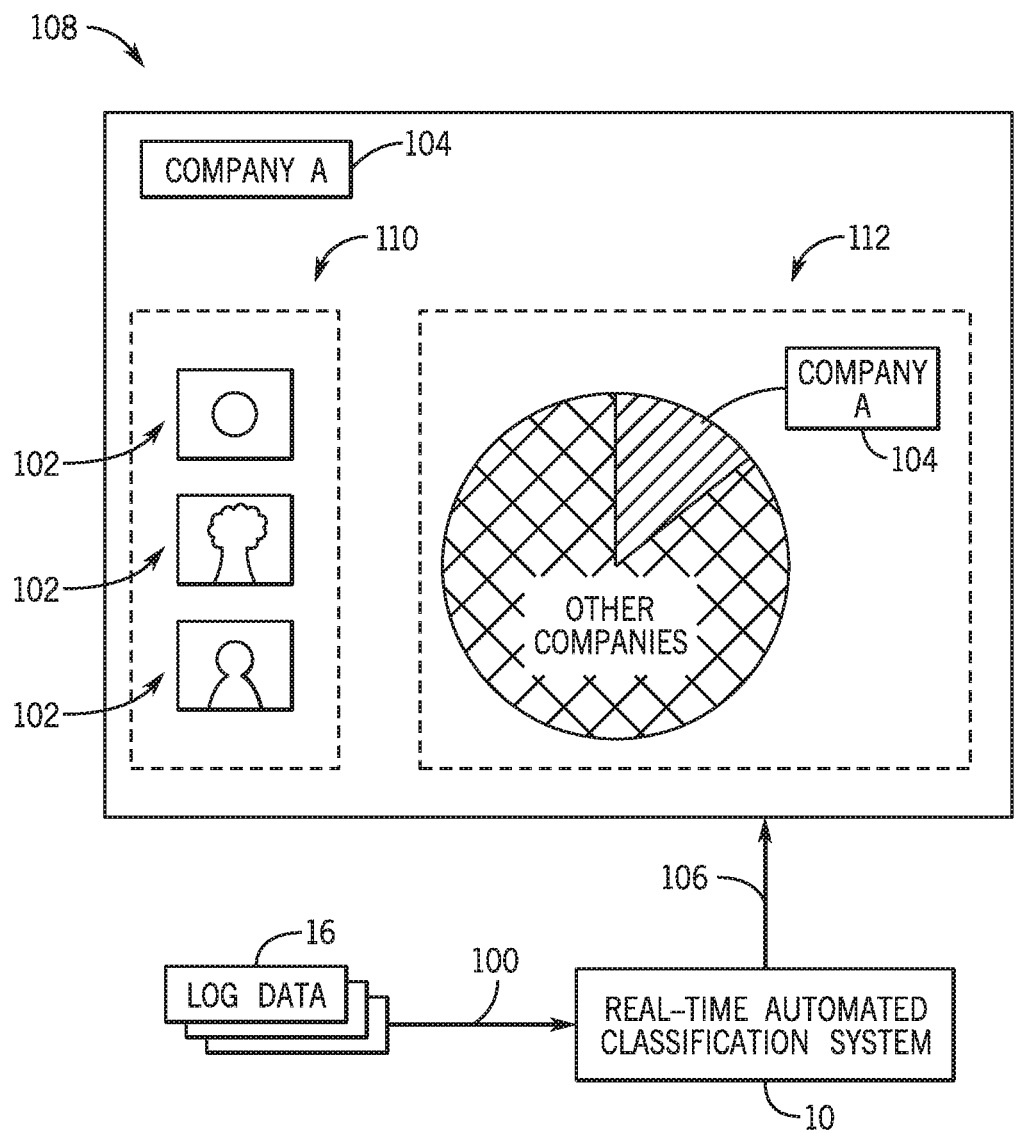
FIG. 7 is a schematic illustrating an example of the real-time automated classification system of FIG. 1 providing an automated report relating to broadcast content, in accordance with an embodiment of the present disclosure.

FIG. 7 is a schematic illustrating an example of the real-time automated classification system 10 of FIG. 1 providing an automated report relating to broadcast content. In the illustrated embodiment, the log data 16 is received and/or accumulated by the real-time automated classification system 10 as indicated by an arrow 100. The real-time automated classification system 10 may derive the metadata 39 based on the log data 16. For example, closed captioning logs or teleprompter logs may provide an indication of text that has been spoken and/or will be spoken during the content capture. This log data 16 may be used to identify a particular context or topic of the content.

In the illustrated example, the metadata 39 may include information that allows the real-time automated classification system 10 to determine that particular one or more portions of the broadcast content include information 102 relating to a specific target 104. In this case, the specific target 104 is "Company A", and the information 102 may include any suitable information about Company A, such as market share information, performance information, industry segment information of Company A, etc. In response to such determination, the real-time automated classification system 10 may automate instructions to generate (as indicated by an arrow 106) a report 108 or broadcast or digital graphic about Company A. In some embodiments, the real-time automated classification system 10 may automate instructions to organize, summarize, and present information in the broadcast content in a suitable manner. For example, a news anchor may speak (or receive teleprompter text) about Company A's practices in different segments during the live broadcasting, and the real-time automated classification system 10 may organize, summarize, or transform the content spoken (or the teleprompter text) by the news anchor into visual representations 110, e.g., graphical representations, pictures, images, plots, tables, texts, in the generated report 108. In some embodiments, the real-time automated classification system 10 may automate instructions to search information (e.g., historical broadcast content, searchable information on Internet, information in the broadcast content) and organize, summarize, or transform the information found in the search into visual representations 112, e.g., graphical representations, pictures, images, plots, tables, texts, in the generated report 108. The real-time automated classification system 10 may incorporate or insert the report 108 into the broadcast content at a suitable time during broadcasting, distribute or send the report 108 to authorized personnel (e.g., a news reporter, a producer, an editor of the live broadcast), or both. Moreover, the real-time automated classification system 10 may generate the report 108 based on user input. For example, a user may request reports be generated based on a keyword. More specifically, the real-time automated classification system 10 may generate content specific to the keyword. For instance, a user may request a report about a specific stock listing, television program, person (e.g., actor, anchor, guest), or other type of information associated with content. The real-time automated classification system 10 may filter data based on the request and provide the report 108. Additionally, there are also digital applications to the automated reports 108, content, and graphics. For example, information and charts of content can be distributed on an enhanced landing page of clipped videos, such as a video made of the auto-clipped segments 88. It should be noted that the processes set forth above in FIG. 7 may occur real-time or substantially real-time with respect to the live broadcasting.

FIG. 8 is a schematic illustrating an example of the real-time automated classification system 10 of FIG. 1 providing an automated control relating to broadcast content. In the illustrated embodiment, the log data 16 is received and/or accumulated by the real-time automated classification system 10 as indicated by an arrow 120. The real-time automated classification system 10 may derive the metadata 39 based on the log data 16. The metadata 39 may include information that allows the real-time automated classification system 10 to determine originalities of the different log data 16 (e.g., the log data 16 from microphones, audio devices, cameras). In addition, the metadata 39 may include information that allows the real-time automated classification system 10 to determine that a portion of the log data 16 is more important or has a higher priority than another portion of the log data 16 depending on what is happening in the broadcast content. For example, the real-time automated classification system 10 may determine that a portion of the log data 16 corresponds to verbiage audio signals 122, e.g., audio signals from one or more microphones used by a live show host. The real-time automated classification system 10 may determine that another portion of the log data 16 corresponds to background audio signals 124, e.g., audio signals from one or more audio devices disposed in the live broadcast, such as music cues or sound effects.

Further, the real-time automated classification system 10 may determine that for particular time segments of the broadcast content, the verbiage audio signals 122 may be more important than the background audio signals 124. For example, for the particular time segments that the live show host is speaking, the verbiage audio signals 122 may be more important than the background audio signals 124, like music. Upon such determination, the real-time automated classification system 10 may generate control inputs 126 and send (indicated by an arrow 128) the control inputs 126 to a suitable control system configured to eliminate the background sound, which enables further machine learning processes like Natural Language Processing to work more efficiently. In particular, the control inputs 126 are configured to cause the suitable control system to adjust processing of the verbiage audio signals 122 with respect to the background audio signals 124 corresponding to what is happening in the broadcast content. For example, the control inputs 126 may be configured to cause a suitable audio control system to perform mathematical manipulation, scaling, and/or transformation on the verbiage audio signals 122 and/or the background audio signals 124, such that when the live show host is speaking, the host's voice is clear (e.g., not distracted by the background sound/voice) in the broadcast content. It should be noted that the processes set forth above in FIG. 8 may occur real-time or substantially real-time with respect to the live broadcasting.

FIG. 9 is a schematic illustrating an example of the real-time automated classification system 10 of FIG. 1 providing an automated text file relating to broadcast content. In the illustrated embodiment, the log data 16 is received and/or accumulated by the real-time automated classification system 10 as indicated by an arrow 140. The real-time automated classification system 10 may derive the metadata 39 based on the log data 16. The metadata 39 may include information that allows the real-time automated classification system 10 to determine one or more audio files to be translated and/or corresponding captions to be generated. For example, based on information in the metadata 39, the real-time automated classification system 10 may determine content in a particular isolated audio track to be translated and/or corresponding captions to be generated. In response to such determination, the real-time automated classification system 10 may automate instructions (as indicated by an arrow 142) to translate and/or generate (as indicated by an arrow 144) captions or a text file 146 for the corresponding content of the particular isolated audio track. For example, an automated speech translation system may be used to generate translated captions (e.g., the text file 146) for the corresponding speech. For example, an automated speech recognition system may be used to generate captions (e.g., the text file 146) for the corresponding speech. The real-time automated classification system 10 may incorporate or insert the text file 146 in the broadcast content. It should be noted that the processes set forth above in FIG. 9 may occur real-time or substantially real-time with respect to the live broadcasting.

The real-time automated classification system 10 enables metadata to be utilized for several other purposes. For instance, metadata may enable enhanced searches to be performed. For example, as described above, log data 16 may be associated with metadata or "tags." Users may request content or items associated with content (e.g., log data 16, graphics, text, information about the content). The real-time automated classification system 10 may search for tags based on the user request and return content or other data (e.g., log data 16, graphics) that are associated with a tag that the real-time classification system 10 searched for. As another example, while determining an automated suggestion relating to broadcast content, the real-time classification system 10 may search through databases of content, graphics, log data 16, and other data. The real-time classification system 10 may make a suggestion based at least in part on data tags associated with broadcast content for which the suggestion is made. For example, the real-time classification system 10 may determine (e.g., based on log data 16 associated with a teleprompter or speech recognition analysis of audio from the broadcast) that a company is being discussed as part of a broadcast related to the stock market. A data tag may exist for the company. Accordingly, the real-time classification system 10 may determine other content associated with the same data tag (e.g., graphics or charts associated with the company from prior broadcasts), and suggest that the other content be incorporated into the broadcast.

As another example of how data may be correlated and how metadata may be utilized, the real-time automated classification system 10 may determine correlations between companies, industries, and commodities. For example, a data library may include information regarding companies, industries, and commodities. The real-time automated classification system 10 may analyze the data regarding the companies, industries, and commodities and determine whether various companies, industries, and commodities are interrelated. For example, a company may manufacture cell phones. The real-time automated classification system 10 may determine that the company makes the cell phone (e.g., based on log data 16 from a CG log, newsroom computer system log (e.g., a prompter log), searchable information on the Internet) and add metadata tags to indicate that the company makes and sells cell phones and that the company is in a particular industry or sector (e.g., technology).

Additionally, real-time automated classification system 10 may determine other companies that may be related to the company. For example, the real-time automated classification system 10 may search log data 16 from previous broadcasts to determine potential competitors, customers, and/or suppliers of the company. For example, a previous broadcast may have related to a company that makes mobile processors. Based on log data 16 associated with such a broadcast, the real-time automated classification system 10 may determine that the mobile processor company could be a supplier to the cell phone manufacturing company.

Expanding on this example, the real-time automated classification system 10 may determine an entire product chain related to a product, such as the cell phone discussed above. For instance, the real-time automated classification system 10 may add data tags to indicate various parts or commodities typically used in cell phones, such as screens, various circuitry, commodities from which components in the cell phone are made (e.g., lithium, silicon). The real-time automated classification system 10 may determine log data 16 associated with such companies and commodities, and add data tags to indicate that the companies and commodities may be, or are, in the supply chain for the product (e.g., the cell phone).

The real-time automated classification system 10 may make suggestions based on metadata indicative of connections between companies and/or commodities. For instance, based on log data 16 (e.g., CG log data 16b, newsroom computer system log data 16c, tally log data 16a) associated with a broadcast, the real-time automated classification system 10 may determine that a company is being discussed. Based on this determination, the real-time automated classification system 10 may suggest content be added for one or more companies or commodities in the same supply chain as the company being discussed.

Additionally, the real-time automated classification system 10 may enable data streams to be established based on the metadata. For example, as content is broadcasted, the real-time automated classification system 10 may determine that the content is related to a particular subject. For example, in a broadcast regarding investing, the content may be related to a company. The real-time automated classification system 10, as indicated above, may determine that the content is related to the company based on the log data 16 associated with the broadcast. When the real-time automated classification system 10 makes determines that the broadcast is related to the company, the real-time automated classification system 10 may generate metadata (e.g., data tags) indicating that the broadcast is related to the company. More specifically, the real-time automated classification system 10 may determine a portion of the broadcast related to the company (e.g., specific frames of content from the broadcast relating to the company) to be a key moment. Accordingly, the real-time automated classification system 10 may determine supply chains related to companies, products made by companies, and commodities. Furthermore the real-time automated classification system 10 may provide suggestions related to the determined supply chains in real-time or substantially real-time with respect to the live broadcasting.

Moreover, a data stream, such as a data feed (e.g., a Rich Site Summary (RSS) feed), specific to the company may exist or be established. As content is broadcasted and identified as being related to the company, the real-time automated classification system 10 may automatically add the content, portions of the content, or other information related to the company, to the data stream in real-time or substantially real-time with respect to the live broadcasting. For example, data related to the content may include a stock chart or information about a company or commodity in the same supply chain as the company. The real-time automated classification system 10 may include such information in the data steam in addition to content or portions of the content from broadcast.

In another embodiment, the real-time automated classification system 10 may enable generation of movie clips based on recorded video content. In an aspect, the real-time automated classification system 10 may generate clips based on when a particular actor appears or when a group of actor appears in the video. In another aspect, the real-time automated classification system 10 may generate clips based on when one or more actors appears in a scene and an event occurs (e.g., an explosion). The event may be tagged by the real-time automated classification system 10. In another aspect, the real-time automated classification system 10 may generate clips when a particular actor appears in a scene and a particular sound or portion of the soundtrack is played back. In another aspect, the real-time automated classification system 10 may generate clips when an actor or group of actors recites a phrase or series of phrases.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory machine-readable medium comprising machine-readable instructions that, when executed by one or more processors, cause the one or more processors to:

receive log data generated during generation of broadcast content from one or more devices associated with generation of the broadcast content, wherein the log data comprises time code information, text information, audio log data, real-time graphic system log data, tally log data, switcher log data, newsroom system log data, MOS gateway log data, replay log data, character generator log data, video playout log data, or a combination thereof;

generate metadata associated with the broadcast content from one or more features derived from the log data; and perform, during broadcasting of the broadcast content and based on the metadata, automated control, automated suggestions, automated reporting, or a combination thereof.

2. The non-transitory machine-readable medium of claim 1, wherein the log data comprises the time code information, the text information, the audio log data, the real-time graphic system log data, or a combination thereof.

3. The non-transitory machine-readable medium of claim 1, wherein the log data comprises the tally log data, wherein the tally log data is indicative of an on-air status of the one or more devices.

4. The non-transitory machine-readable medium of claim 1, wherein:
the metadata comprises an indication of one or more highlight moments of the broadcast content; and
the machine-readable instructions, when executed, cause the one or more processors to generate a clip corresponding to the one or more highlight moments of the broadcast content.

5. The non-transitory machine-readable medium of claim 4, wherein the machine-readable instructions, when executed, cause the one or more processors to perform automated suggestions by incorporating the clip into the broadcast content.

6. The non-transitory machine-readable medium of claim 1, wherein the machine-readable instructions, when executed, cause the one or more processors to perform automated suggestions by:
generating a suggestion for a graphical representation corresponding to a current portion of the broadcast content; and
incorporating the graphical representation in the broadcast content.

7. The non-transitory machine-readable medium of claim 1, wherein the machine-readable instructions, when executed, cause the one or more processors to derive the one or more features by characterizing the log data, correlating the log data, or both.

8. A machine-implemented method for providing real-time automated logging of broadcast content, comprising:
receiving log data generated during generation of the broadcast content from one or more devices associated with generation of the broadcast content, wherein the log data comprises time code information, text information, audio log data, real-time graphic system log data, tally log data, switcher log data, newsroom system log data, MOS gateway log data, replay log data, character generator log data, video playout log data, or a combination thereof;
generating, from one or more features derived from the log data, metadata comprising data indicative of content within the broadcast content; and
performing, during broadcasting of the broadcast content and based on the metadata, automated control, automated suggestions, automated reporting, or a combination thereof.

9. The machine-implemented method of claim 8, wherein:
the log data comprises the audio log data, real-time the graphic system log data, the tally log data, the switcher log data, the newsroom system log data, MOS gateway log data, the replay log data, the character generator log data, the video playout log data, or a combination thereof; and
the tally log data is indicative of an on-air status of the one or more devices.

10. The machine-implemented method of claim 8, wherein the log data or metadata comprises data regarding a person appearing in the broadcast content.

11. The machine-implemented method of claim 10, wherein performing automated suggestions comprises:
generating a suggestion for a picture, plot, table, or text based on the person; and
incorporating the picture, plot, table, or text into the broadcast content.

12. The machine-implemented method of claim 11, wherein the picture, plot, table, or text comprises information about the person or a topic discussed by the person.

13. The machine-implemented method of claim 10, comprising:
generating a video clip from previously-captured content in which the person appears; and
performing automated suggestions by incorporating the video clip into the broadcast content.

14. The machine-implemented method of claim 8, comprising determining the content within the broadcast content.

15. The machine-implemented method of claim 8, wherein performing automated suggestions comprises generating textual or graphical data associated with verbiage present on a verbiage channel.

16. A real-time automated classification system, comprising:
a machine learning module implemented at least partially by one or more processors executing, wherein the machine learning module is configured to:
receive log data generated during generation of broadcast content from one or more devices associated with generation of the broadcast content, wherein the log data comprise time code information, text information, audio log data, real-time graphic system log data, tally log data, switcher log data, newsroom system log data, MOS gateway log data, replay log data, character generator log data, video playout log data, or a combination thereof;
derive one or more features from the log data by characterizing the log data, correlating the log data, or both;
generate metadata associated with the broadcast content from the one or more features derived from the log data; and
perform, during broadcasting of the broadcast content, automated control, automated suggestions, automated reporting, or a combination thereof, based on the metadata.

17. The real-time automated classification system of claim 16, wherein the log data comprises the switcher log data, the newsroom system log data, the MOS gateway log data, the replay log data, the character generator log data, the video playout log data, or a combination thereof.

18. The real-time automated classification system of claim 16, wherein the machine learning module is configured to be trained based on records of previous live broadcast content.

19. The real-time automated classification system of claim 16, comprising a control system having one or more processors configured to alter the broadcast content by automatically incorporating the automated suggestions into the broadcast content.

20. The real-time automated classification system of claim 19, wherein the one or more processors of the control system are configured to:
request an approval of predicted automated suggestions, the predicted automated reporting, or both; and
in response to receiving the approval, incorporate the automated suggestions, the automated reporting, or both in the broadcast content.

* * * * *